July 26, 1932. M. L. ECKMAN 1,869,188
SPOT WELDER
Filed Dec. 8, 1930
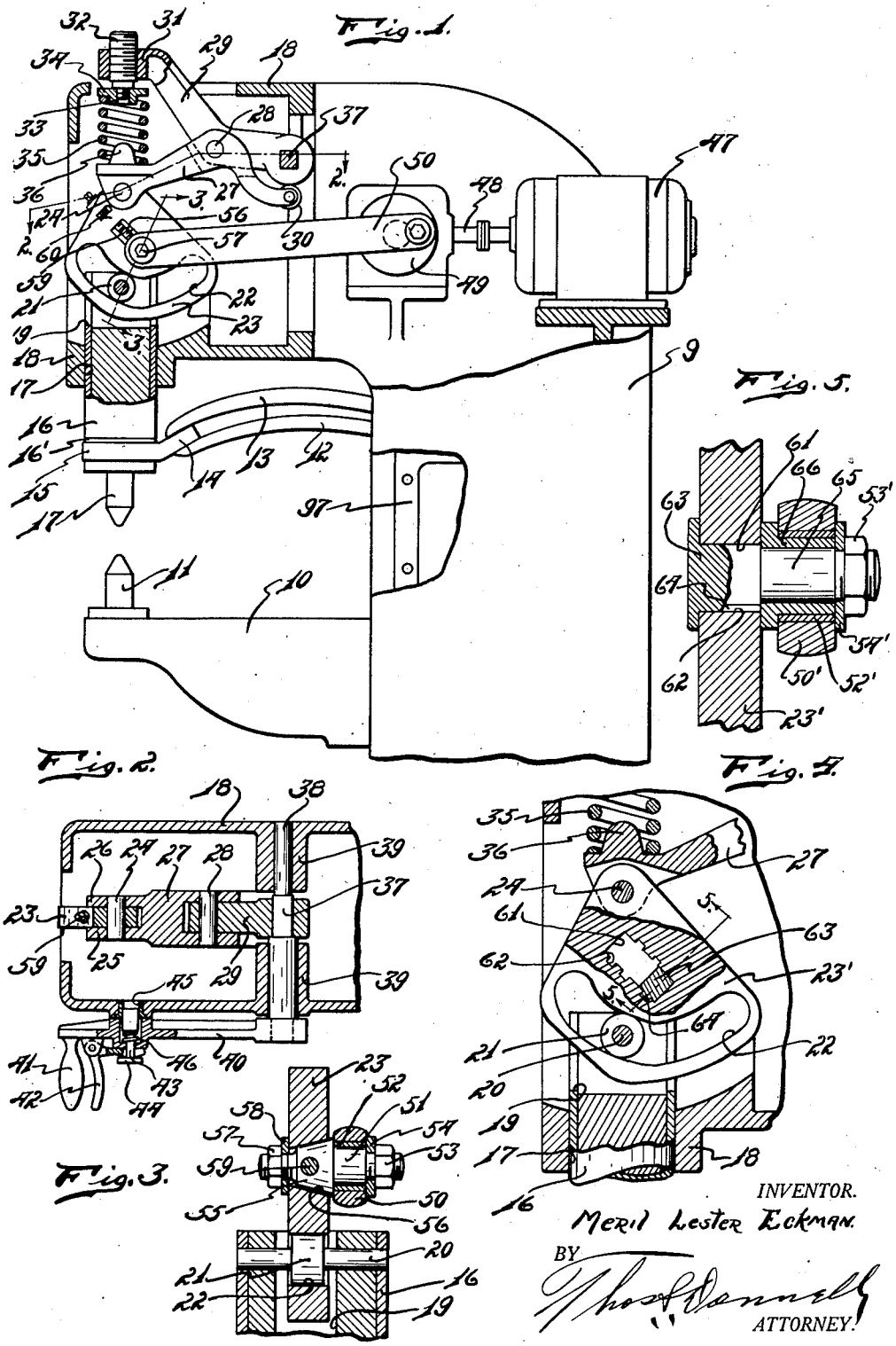
INVENTOR.
Meril Lester Eckman.
BY
ATTORNEY.

Patented July 26, 1932

1,869,188

UNITED STATES PATENT OFFICE

MERIL LESTER ECKMAN, OF WARREN, OHIO

SPOT WELDER

Application filed December 8, 1930. Serial No. 500,812.

My invention relates to a new and useful improvement in a welding mechanism and relates particularly to the method of applying power to a movable head and also to a mechanism for adjusting the stroke or length of movement of the movable head, so as to provide a mechanism whereby a variable stroke may be obtained.

Another object of the invention is the provision in a welding mechanism of a means for changing rotative motion to reciprocative motion and also for obtaining in a welding mechanism a quick approach, a long dwell, and quick retraction, while at the same time a smooth and quiet action is obtained.

Another object is the provision in a welding mechanism of an actuating cam and of an adjustably operating mechanism whereby the movement of the cam may be varied easily and quickly.

Another object of the invention is the provision in a welding mechanism of a quickly released support so that the movable welding point may be easily and quickly moved to any desired position without disturbing the adjustment maintained in normal operations.

Another object of the invention is the provision in a welding mechanism of this class of a yieldable resistance for resisting backward movement of the movable welding point when the same is applied against the material to be welded.

Other objects will appear hereinafter.

The invention consists in the combination and arrangement of parts hereinafter described and claimed.

The invention will be best understood by a reference to the accompanying drawing which forms a part of this specifiction and in which, Fig. 1 is a side elevational view of the invention with parts broken away and parts shown in section.

Fig. 2 is a fragmentary sectional view taken on line 2—2 of Fig 1.

Fig. 3 is a fragmentary sectional view taken on line 3—3 of Fig. 1.

Fig. 4 is a fragmentary side elevational view of a modified form of the invention with parts broken away and parts shown in section.

Fig. 5 is a fragmentary sectional view taken on line 5—5 of Fig. 4.

In the drawing I have illustrated the invention used on a spot welder having the supporting standard 9 projecting outwardly from which is the bracket 10 on which the stationary welding point 11 is mounted. Extending outwardly from the standard 9 are laminated copper conductors 12 and 13 which are secured at their ends to the copper terminal projection 14 of the terminal block 15 carried by the movable head 16 and insulated therefrom by the layer 16' of insulation. These conductors 12 and 13 connect to the transformer 97 at one side, the opposed conductor being the bracket 10.

The movable head 16 carries the welding point 17 in alignment with and adapted to co-operate with the welding point 11. The head 16 is slidably projected through the opening 17' formed in the housing 18. A diametrically extended slot 19 is formed in the upper end of the head 16. Extended through the upper end of the head 16 at right angles to the slot 19 is the pin 20 on which is mounted the roller 21 which engages in the cam groove 22 formed in the cam plate 23. The upper end of the cam plate 23 is pivotally mounted by means of the pin 24 between the bifurcations of the rockable arm 27. This arm 27 is rockably mounted by the pin 28 on the resistance arm 29. A roller 30 carried on the rear end of the arm 27 is normally in engagement with the arm 29. The arm 29 is provided on its upper end with an angularly turned head 31 through which is threaded the adjusting screw 32 having the reduced portion 33 engaging in a washer 34. A coil spring 35 engages at one end the washer 34 and at its opposite end embraces the upwardly projecting boss 36 on the arm 27.

The arm 29 is mounted on a squared or flat faced portion 37 of the shaft 38 which is rotatably mounted in the bearings 39 on the housing 18. Fixedly mounted on the outer end of the shaft 38 is a crank 40 having the handle 41 at one end. A rockably mounted grip release 42 is provided for retraction against the tension of the spring 46 of the plunger 43 from the bushing 45 which is mounted in an opening formed in the housing 18, this plunger 43 having a head 44 on its outer end.

An electric motor 47 is used for operating the mechanism and its shaft is connected to the shaft 48 which is used for driving a proper gearing so as to effect a rotation of the disc 49 to which one end of the link 50 is eccentrically connected. The opposite end of the link 50 embraces a bushing 52 positioned on the reduced portion 51 of a stud. A washer 54 and a nut 53 serve to retain the link 50 connected to the stud 51. A conical shaped or tapered head 55 is carried by the stud 51 and engages in the slot 56 formed in the cam plate 23. A nut 57 and a washer 58 serve to retain the head 55 in the slot 56. Swivelly connected to the head 55 is the threaded stem or adjusting screw 59 which is threaded through the portion 60 of the plate 23.

In operation, when motor 47 effects a rotation of the disc 49, a reciprocatory movement will be imparted to the link 50 so as to effect a rocking of the plate 23 on the pin 24 as an axis. As this rocking movement is effected, the head 16 will be reciprocated. By moving the head 55 longitudinally of the slot 56 the "throw" or amount of movement of the plate 23 will be adjusted, and in this way the movement of the head 16 may be regulated.

The spring 35 serves as a yieldable resistance so that the head 16 may be forced rearwardly when placed under an over-load or an abnormal strain. By retracting the plunger 43 and rocking the shaft 38, the head 16 may be moved upwardly or downwardly without disturbing the adjustment made by the adjusting screw 59, so that a large clearance between the welding points may be easily and quickly effected.

By moving the point of connection of the link 50 toward or away from the point of pivot of the cam plate 23, while still housing the same cam slot 22, a variable movement of the head 16 may be effected. The connection between the motor 47 and the plate 23 serves to translate the rotative motion to the reciprocating movement of the head, and with this mechanism a smooth action may be obtained while a quick approach, a long dwell, and a quick retraction may be obtained. In this respect invention is considerably advanced in efficiency over a rotating cam mechanism in which it is very difficult to obtain a smooth action with a dwell greater than 180 degrees.

In the form shown in Fig. 4 and Fig. 5, the mechanism is as already described except the method of obtaining the adjustment is somewhat different. In this modified form a fixed adjustment at predetermined stages is effected, while in the preferred form substantially an infinite number of positions of adjustment may be obtained. In the modified form the plate 23' is provided with a slot 61 corresponding with the slot 56 in some respects. Rests 62 are formed in the side of the slot 61 and are adapted for receiving the outwardly projecting rib 64 which is formed on the bearing block 63. This bearing block 63 is provided with the reduced portion 65 on which is positioned the clamping bushing 66. Embracing the clamping bushing 66 is the bushing 52' over which the end of the link 50' engages. The nut 53' and the washer 54' serve to retain the link in position. In making the adjustment the nut 53' would be removed and the bearing block 63 moved longitudinally until the rib 64 cleared the plate 23' after which the block 63 may be moved to the desired predetermined position and the clamping and securing parts again placed thereon.

While I have illustrated and described the preferred form of construction, I do not wish to limit myself to the precise details of structure shown but desire to avail myself of such variations and modifications as come within the scope of the appended claims.

Having thus described my invention what I claim as new and desire to secure by Letters Patent is:

1. In a welding mechanism, of the class described, a reciprocating head; a swingable cam member, operatively connected with said head for reciprocating the same upon swinging movement of said cam member; and means for swinging said cam member.

2. In a welding mechanism, of the class described, a reciprocating head; a swingable cam member, operatively connected with said head for reciprocating the same upon swinging movement of said cam member; and means for regulating the amount of swinging of said cam member.

3. In a welding mechanism, of the class described, a reciprocating head; a cam mechanism operatively connected with said head for reciprocating the same; reciprocating means for operating said cam mechanism; and rotating means for effecting reciprocation of said reciprocating means.

4. In a welding mechanism, of the class described, a reciprocating head; a swingable cam member for reciprocating said head; a swingable support for said cam member; and resilient means for normally resisting swingable movement of said support.

5. In a welding mechanism, of the class described, a reciprocating head; a swingably mounted cam for reciprocating said head; a swingable support for said cam; resilient means for resisting swingable movement of said support; a swingable carrying member for carrying said support.

6. In a welding mechanism, of the class described, a reciprocating head; a swingably mounted cam for reciprocating said head;

a swingable support for said cam; resilient means for resisting swingable movement of said support; a swingable carrying member for carrying said support; and releasable means for resisting swingable movement of said carrying member.

7. In a welding mechanism, of the class described, a reciprocating head; a swingable cam for reciprocating said head upon swingable movement; a reciprocating member for swinging said cam; a rotatable member for reciprocating said reciprocating member; and means for varying the point of connection of said reciprocating member with said cam for determining the amount of swingable movement thereof.

In testimony whereof I have signed the foregoing specification.

MERIL LESTER ECKMAN.